(12) United States Patent
Govindaraj et al.

(10) Patent No.: US 10,664,728 B2
(45) Date of Patent: May 26, 2020

(54) METHOD AND DEVICE FOR DETECTING OBJECTS FROM SCENE IMAGES BY USING DYNAMIC KNOWLEDGE BASE

(71) Applicant: WIPRO LIMITED, Bangalore (IN)

(72) Inventors: Balaji Govindaraj, Chennai (IN); Mohd Zaid, Delhi (IN); Sujatha Jagannath, Bangalore (IN)

(73) Assignee: Wipro Limited, Bangalore (IN)

( * ) Notice: Subject to any disclaimer, the term of this patent is extended or adjusted under 35 U.S.C. 154(b) by 115 days.

(21) Appl. No.: 15/907,678

(22) Filed: Feb. 28, 2018

(65) Prior Publication Data

US 2019/0205706 A1 Jul. 4, 2019

(30) Foreign Application Priority Data

Dec. 30, 2017 (IN) .............................. 201741047409

(51) Int. Cl.

| | |
|---|---|
| G06K 9/66 | (2006.01) |
| G06K 9/00 | (2006.01) |
| G06T 7/10 | (2017.01) |
| G06N 20/00 | (2019.01) |
| G06F 16/532 | (2019.01) |
| G06F 16/951 | (2019.01) |

(Continued)

(52) U.S. Cl.
CPC ............. *G06K 9/66* (2013.01); *G06F 16/532* (2019.01); *G06F 16/951* (2019.01); *G06K 9/00771* (2013.01); *G06K 9/00791* (2013.01); *G06K 9/6262* (2013.01); *G06K 9/6276* (2013.01); *G06N 5/046* (2013.01); *G06N 20/00* (2019.01); *G06T 7/10* (2017.01)

(58) Field of Classification Search
None
See application file for complete search history.

(56) References Cited

U.S. PATENT DOCUMENTS

| | | | |
|---|---|---|---|
| 10,282,431 B1 * | 5/2019 | Bhotika | .............. G06F 16/5838 |
| 2015/0113388 A1 * | 4/2015 | Barrett | .................. G06F 40/169 |
| | | | 715/249 |

(Continued)

FOREIGN PATENT DOCUMENTS

| | | |
|---|---|---|
| CN | 104680508 | 6/2015 |
| CN | 105913087 | 8/2016 |
| CN | 106599832 | 4/2017 |

*Primary Examiner* — Kevin Ky
(74) *Attorney, Agent, or Firm* — Finnegan, Henderson, Farabow, Garrett & Dunner, LLP (57) ABSTRACT

A method and device for detecting objects from scene images by using dynamic knowledge base is disclosed. The method includes segmenting a scene image captured by at least one camera into a plurality of image segments. Each of the plurality of image segments include a plurality of pixels. The method further includes detecting at least one object in each of the plurality of image segments. The method includes finding a plurality of similar images from an online database based on the at least one object. The method further includes identifying using a knowledge base engine, at least one similar object in the plurality of similar images. The method includes updating the knowledge base engine based on the at least one similar object identified from the plurality of similar images. The method further includes training a neural network to detect objects from scene images, based on the updated knowledge base engine.

18 Claims, 7 Drawing Sheets

(51) Int. Cl.
*G06K 9/62* (2006.01)
*G06N 5/04* (2006.01)

(56) References Cited

U.S. PATENT DOCUMENTS

| | | | |
|---|---|---|---|
| 2017/0124152 A1* | 5/2017 | Nerurkar | G06N 5/003 |
| 2018/0349384 A1* | 12/2018 | Nerurkar | G06F 21/6254 |
| 2019/0005089 A1* | 1/2019 | Kempf | G06F 16/248 |
| 2019/0066304 A1* | 2/2019 | Hirano | G06T 7/12 |
| 2019/0138743 A1* | 5/2019 | Nerurkar | G06F 16/2453 |
| 2019/0187720 A1* | 6/2019 | Fowe | G06N 20/00 |

* cited by examiner

METHOD AND DEVICE FOR DETECTING OBJECTS FROM SCENE IMAGES BY USING DYNAMIC KNOWLEDGE BASE

TECHNICAL FIELD

This disclosure relates generally to detecting objects from images and more particularly to method and device for detecting objects from scene images by using dynamic knowledge base.

BACKGROUND

For an autonomous vehicle, intelligently identifying objects ahead of it, inferring the information, and providing accurate inputs to a control system of the autonomous vehicle is very important for smooth navigation. The information regarding identified objects helps the control system of autonomous vehicle to guide the vehicle in correct manner in order to avoid any collision and breakdown. In other words, this information may help the control system to imitate human intelligence.

However, while a vehicle is moving, capturing images of the scene in front of the vehicle and identifying objects in the image at the same speed as human perception is tedious in case of autonomous vehicle. The reason being that a lot of data collection and processing is involved in limited computing systems configuration. Hence it is difficult to catchup at higher speeds of the vehicle.

In conventional solutions, the control systems are trained only once with the available limited set of data (or manual training data). However, this is not sufficient as there will be new and different objects observed every other day during real time vehicle navigation. This conventional solution thus frequently requires manual trainings. However, one-time training with large data set is difficult, as relevant data has to be collected, identified, and then classified, before it can be used to train the control systems.

SUMMARY

In one embodiment, a method for detecting objects from scene images is disclosed. The method includes segmenting, by an image processing device, a scene image captured by at least one camera into a plurality of image segments. Each of the plurality of image segments comprise a plurality of pixels. The method further includes detecting, by the image processing device, at least one object in each of the plurality of image segments. The method includes finding, by the image processing device, a plurality of similar images from an online database based on the at least one object identified in each of the plurality of image segments. The method further includes identifying using a knowledge base engine, by the image processing device, at least one similar object in the plurality of similar images based on associated description and image characteristics. The method includes updating, by the image processing device, the knowledge base engine based on the at least one similar object identified from the plurality of similar images. The method further includes training, by the image processing device, a neural network to detect objects from scene images captured by the at least one camera, based on the updated knowledge base engine.

In another embodiment, an image processing device for detecting objects from scene images is disclosed. The image processing device includes a processor, and a memory communicatively coupled to the processor, wherein the memory stores processor instructions, which, on execution, causes the processor to segment a scene image captured by at least one camera into a plurality of image segments, wherein each of the plurality of image segments comprise a plurality of pixels; detect at least one object in each of the plurality of image segments; find a plurality of similar images from an online database based on the at least one object identified in each of the plurality of image segments; identify using a knowledge base engine, at least one similar object in the plurality of similar images based on associated description and image characteristics; update the knowledge base engine based on the at least one similar object identified from the plurality of similar images; and train a neural network to detect objects from scene images captured by the at least one camera, based on the updated knowledge base engine.

In yet another embodiment, a non-transitory computer-readable storage medium is disclosed. The non-transitory computer-readable storage medium has instructions stored thereon, a set of computer-executable instructions causing a computer comprising one or more processors to perform steps comprising segmenting a scene image captured by at least one camera into a plurality of image segments, wherein each of the plurality of image segments comprise a plurality of pixels; detecting at least one object in each of the plurality of image segments; finding a plurality of similar images from an online database based on the at least one object identified in each of the plurality of image segments; identifying using a knowledge base engine, at least one similar object in the plurality of similar images based on associated description and image characteristics; updating the knowledge base engine based on the at least one similar object identified from the plurality of similar images; and training a neural network to detect objects from scene images captured by the at least one camera, based on the updated knowledge base engine.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
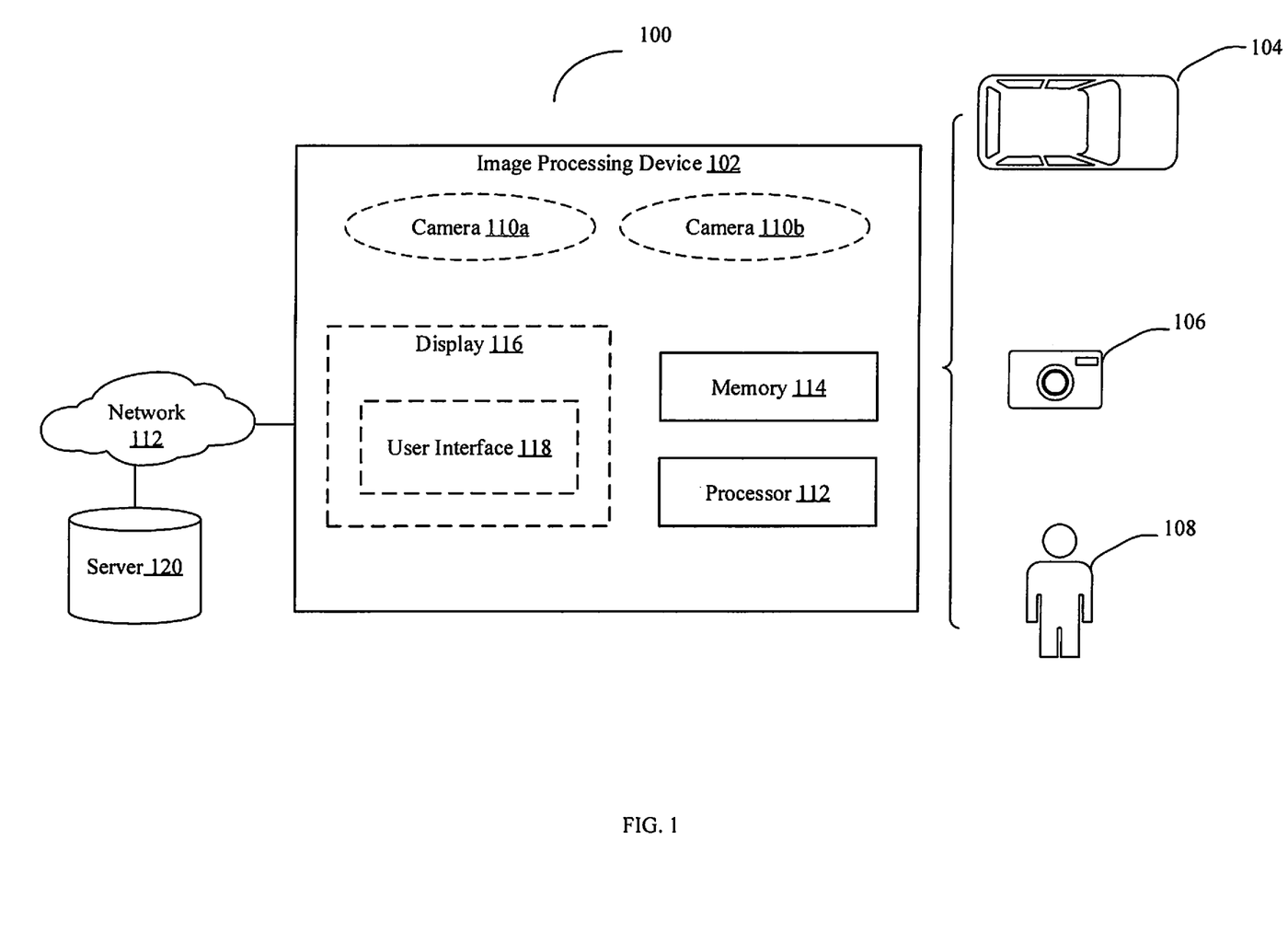
FIG. 1 is a block diagram illustrating an image processing device configured to detect objects from scene images within an environment, in accordance with an embodiment.

Additional illustrative embodiments are listed below. In one embodiment, a block diagram of an image processing device 102 configured to detect objects from scene images captured within an environment is illustrated in FIG. 1. Image processing device 102, for example, may be integrated within an autonomous vehicle 104, a CCTV camera 106, and a robot 108 (which is connected to the Internet). It will be apparent to a person skilled in the art that image processing device 102 may be integrated in any environment that may require identification of object within images captured for a particular scene. Especially in the case of autonomous vehicle 104, image processing device 102 enables intelligent object detection from ongoing scenes in front of autonomous vehicle 104. The detected objects are then used to guide and navigate autonomous vehicle 104.

Image processing device 102 may include one or more cameras (for example, a camera 110a and a camera 110b) that may be used to capture one or more images. The one or more cameras may be stereo cameras. In an embodiment, image processing device 102 may not include a camera. In this case, image processing device 102 may receive images captured by external cameras (for example, CCTV camera 106 or a camera fitted in robot 108, which may be eyes of robot 108) as an input and may further process these images to identify objects.

Image processing device 102 may be incorporated in a smart phone, a tablet, a dash camera, or a smart camera. In an embodiment, when image processing device 102 is integrated with autonomous vehicle 102, if an external camera is being used, the camera should be mounted on autonomous vehicle 104 in such a way that the entire scene in front of autonomous vehicle 104 is clearly visible. Moreover, the camera may be oriented perpendicular to autonomous vehicle 104 and the scene.

In order to identify images captured by camera 110a, camera 110b, or an external camera, image processing device 102 includes a processor 112 that is communicatively coupled to a memory 114, which may be a non-volatile memory or a volatile memory. Examples of non-volatile memory, may include, but are not limited to a flash memory, a Read Only Memory (ROM), a Programmable ROM (PROM), Erasable PROM (EPROM), and Electrically EPROM (EEPROM) memory. Examples of volatile memory may include, but are not limited Dynamic Random Access Memory (DRAM), and Static Random-Access memory (SRAM).

Memory 114 further includes various modules that enable accurate identification of objects from captured scene images. These modules are explained in detail in conjunction with FIG. 2. Image processing device 102 may further include a display 116 having a User Interface (UI) 118 that may be used by a user or an administrator to provide various inputs to image processing device 102. Display 116 may further be used to display results of identification of objects from the captured scene images. Display 116 may be a touch screen, thereby enabling a user to interact with image processing device 102, via display 116.

In an embodiment, image processing device 102 may be connected to a server 120, via a Network 122. Server 120 may include an online database of images that have been captured and classified earlier. Network 122 may be a wired or a wireless network and the examples may include, but are not limited to the Internet, Wireless Local Area Network (WLAN), Wi-Fi, Long Term Evolution (LTE), Worldwide Interoperability for Microwave Access (WIMAX), and General Packet Radio Service (GPRS).

Figure 2:
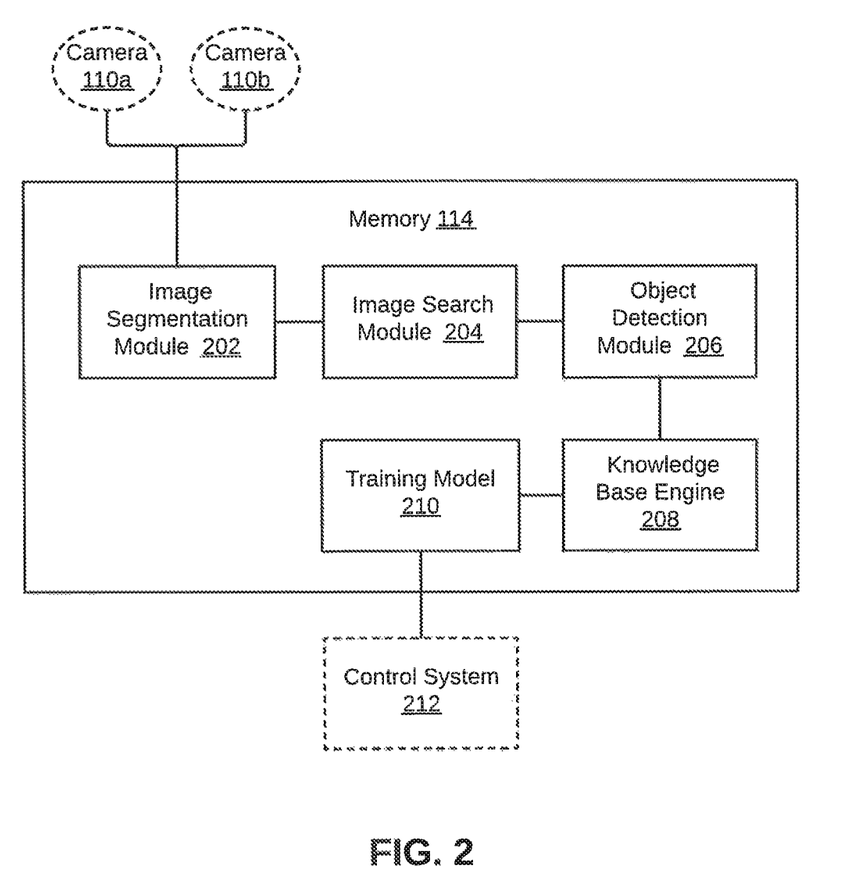
FIG. 2 is a block diagram illustrating various modules within a memory of the image processing device, in accordance with an embodiment.

Referring now to FIG. 2, a block diagram of various modules within memory 114 of image processing device 102 is illustrated, in accordance with an embodiment. Memory 114 includes an image segmentation module 202, an image search module 204, an object detection module 206, a knowledge base engine 208, and a training model 210, which may be in communication with a control system 212. Control system 212 may be a part of autonomous vehicle 104, CCTV camera 106, or robot 108.

Image segmentation module 202 receives a scene image captured by one or more cameras (for example, camera 110a, camera 110b, or an external camera installed in autonomous vehicle 104 or robot 108). Image segmentation module 202 segments the scene image into a plurality of image segments, such that, each of the plurality of image segments include a plurality of pixels. Image segmentation module 202 also detects one or more objects in each of the plurality of image segments. This is further explained in detail in conjunction with FIGS. 3 and 4.

Based on the one or more objects identified in each of the plurality of image segments, image search module 204 finds a plurality of similar images from an online database (not shown in FIG. 2), which may be stored in server 120. This is further explained in detail in conjunction with FIGS. 3 and 5. Thereafter, object detection module 206 communicates with knowledge base engine 208 to identify one or more similar objects in the plurality of similar images based on associated description and image characteristics. Knowledge base engine 208 is used to store complex structured and unstructured information about identified images and helps in identifying one or more objects more precisely after each training cycle. Based on the one or more similar objects identified from the plurality of similar images, knowledge base engine 208 is updated. This is further explained in detail in conjunction with FIGS. 3 and 6.

Based on the updated knowledge base engine 208, training model 210, which includes a neural network, is trained to detect objects from scene images captured by the one or more cameras. The neural network may be a convolutional neural network. Training module 210 then communicates information regarding the detected objects to control system 212. This is further explained in detail in conjunction with FIG. 3.

Figure 3:
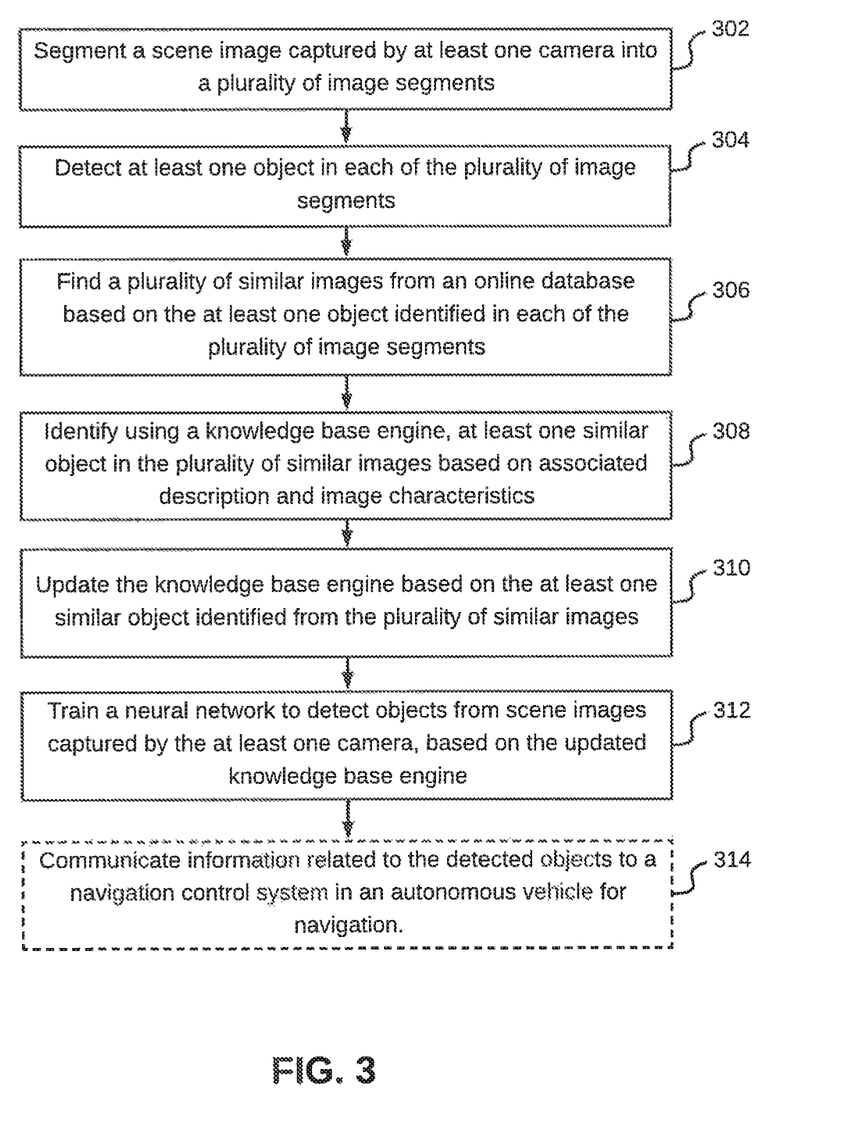
FIG. 3 illustrates a flowchart of a method for detecting objects from scene images, in accordance with an embodiment.

Referring now to FIG. 3, a flowchart of a method for detecting objects from scene images is illustrated, in accordance with an embodiment. A scene image may be captured by one or more cameras installed within autonomous vehicle 104, a CCTV camera 106, camera 110a, or camera 110b. In case the scene image is captured by a camera external to image processing device 102, the scene image is sent to image processing device 102 using standard open source library, for example, open source Computer Vision (CV)-video capture library.

In order to detect objects in the scene image, at step 302, image processing device 102 segments the scene image into a plurality of image segments, such that, each image segment includes a plurality of pixels. The scene image is segmented into a plurality of image segments in order to find different attributes associated with each image segment and to create vector features for them in order to perform further processing. In a color based segmentation of the scene image, different image segments that are present in the scene image may be differentiated based on the Hue Saturation and Value (HSV). This is further explained in detail in conjunction with FIG. 4.

Segmentation of the scene image into a plurality of images is to simplify and change representation of the scene image into more meaningful format that is easier to analyze. In an image segment, a label is assigned to every pixel in the scene image, such that, pixels that have the same label, share one or more image characteristics. The one or more image characteristics may include, but are not limited to one or more of color, intensity, texture, or shape. In an embodiment, the one or more image characteristics are used to grow region of interest in the scene image, based on which the plurality of image segments are identified. This is further explained in detail in conjunction with FIG. 4.

Once the scene image is segmented into a plurality of images, image processing device 102, at step 304, may detect one or more objects in each of the plurality of image segments. In an embodiment, each image segment may include only one object. In order to detect the one or more objects, each image segment may be received by an online database, that may be a web based image search engine. Web API's associated with the image search engine enable identification of objects in each segmented image. The online database, for example, may be saved on server 120 and may be accessed by image processing device 102, via network 112. In an alternate embodiment, a copy of the online database may be stored in memory 114 of image processing device 102, which may be synchronized with the original version periodically.

Based on the one or more objects identified in each of the plurality of image segments, image processing device 102, at step 306, finds a plurality of similar images from the online database. To this end, object related descriptions for each image segment is also retrieved from the online database. This object related description is again sent to the online database or the web search engine in order to retrieve the plurality of similar images, which may include description of objects within the plurality of images. The plurality of similar images may include objects that are similar to one or more objects detected in the plurality of image segments. This is further explained in detail in conjunction with FIG. 5.

Image processing device 102 may then use knowledge base engine 208, at step 308, to identify one or more similar objects in the plurality of similar images. Knowledge base engine 208 has been explained in detail in conjunction with FIG. 2. The one or more similar object may be identified based on description and image characteristics associated with each of the plurality of similar images. Image processing device 102 analyzes the plurality of images based on the associated description and image characteristics. Image processing device 102 may use knowledge base engine 208 to analyze descriptions associated with image segments and the identified similar images. Based on each iteration of such description analysis, image processing device 102 gains more knowledge about the scene image. In an embodiment, a map reduce technique is used to analyze description associated with the plurality of similar images. This is further explained in detail in conjunction with FIG. 6.

Thereafter, at step 310, image processing device 102 updates knowledge base engine 208 with the one or more similar objects identified from the plurality of similar images. This is an iterative process, such that, image processing device 102 continuously updates knowledge base engine 208 with new identified objects. As a result, knowledge base engine 208 helps in accurately identifying upcoming objects in front of an autonomous vehicle. This is further explained in detail in conjunction with FIG. 6.

The updated knowledge base engine 208 may then be used by image processing device 102, at step 312, to train a neural network in order to accurately detect objects from future scene images that would be captured by one or more cameras. Accurate and quick identification of objects is especially important in the case of autonomous vehicle, in order to avoid an accident and to ensure correct navigation of the vehicle. The neural network may be a convolutional neural network that is trained using the updated knowledge base engine 208. The convolutional neural network may be trained in selecting or filtering images based on the description and providing in-depth knowledge about objects in an image. The convolutional neural network is a six layers stack that includes ConvNets, one layer of "RELU" (which is called max layer), one layer of "Pooling", the activation function "SoftMax" & "tan h" and two dropout layers to train and thereafter detect identified objects in scene images.

By way of an example, on a 32×32×3 raw pixel image (in Red, Green and Blue format), layers in convolutional neural network may be applied to compute the output of neurons by multiplying dot product between images. After applying 12 filters, a 32×32×12 pixel image is obtained and RELU layer is further be applied to the images. The image then goes through pool layer, which performs down sampling operation along with special dimension. As a result of down sampling, the image is converted to a 16×16×12 pixel image. Thereafter, a fully connected layer is applied, which will compute class scores and the image will be converted to number of objects using equation 1 given below:

$$\text{Number of objects in an image} = 1 \times (1/N) \quad (1)$$

where,

N represents number of classes associated with the image.

In case image processing device 102 is integrated with an autonomous vehicle, at step 314, image processing device 102 communicates information related to the detected objects to a navigation control system in an autonomous vehicle (for example, autonomous vehicle 104) for navigation. The navigation control system may be a cognitive Artificial Intelligence (AI) module that receives information related to the detected objects and intelligently makes decision for navigating the autonomous vehicle. In alternate applications, image processing device 102 may be integrated with a robot to facilitate its vision, surveillance, and consumer and retails applications. In such cases, image processing device 102 communicates information related to detected objects to a cognitive AI module in the respective application.

Figure 4:
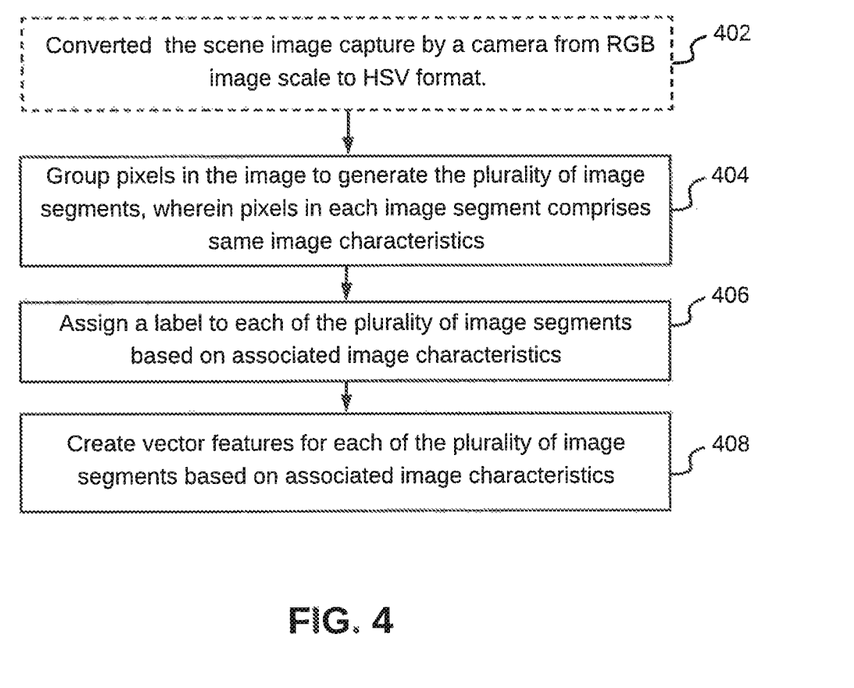
FIG. 4 illustrates a flowchart of a method of segmenting a scene image captured by a camera into a plurality of image segments, in accordance with an embodiment.

Referring now to FIG. 4, a flowchart of a method of segmenting a scene image captured by a camera into a plurality of image segments is illustrated, in accordance with another embodiment. Once the scene image is received, at step 402, the scene image is converted from a Red Green Blue (RGB) image scale to an HSV format. It will be apparent to a person skilled in the art that the format conversion may be from any first format to any other second format. Thereafter, at step 404, pixels in the scene image are grouped to generate a plurality of image segments. Pixels in each image segment include same image characteristics. In other words, grouping of pixels based on similar image characteristics results in segmentation of the scene image. The image characteristics may include one or more of, but is not limited to one or more of color, intensity, texture, or shape. In an embodiment, pixels in the image scene may be grouped based on the HSV format, resulting into a plurality of image segments. In another embodiment, color pixels may be grouped to create color based image segments.

Each of the plurality of image segments is then assigned a label based on associated image characteristics at step 406. Assigning label to an image segment enables identification of new classes and subclasses of existing classes of image segments. By way of an example, on a given day, image processing device 102 may identify pedestrian as a parent class based on identification of a person walking on the sidewalk in a segment of a scene image. In a similar manner, on a subsequent day, image processing device 102 may identify that one of the pedestrians is a male and another pedestrian is a female. Thus, "male" and "female" would be identified as two subclasses of the parent class "pedestrian."

Once labels have been assigned to each of the plurality of image segments, vector features are created for each of the plurality of image segments at step 408. Vector features for a particular image segment may be created based on associated image characteristics. By way of an example, using HSV format, texture of an image segment is analyzed and texture features are created. Similarly, based on other image characteristics, features related to shape and color are created. The vector features may be used to identify one or more objects in an image segment. More importantly, the vector features thus created for each of the plurality of images segments are used to find a plurality of similar images that include objects that are similar to the one or more objects in the plurality of image segments. This is further explained in detail in conjunction with FIG. 5.

Figure 5:
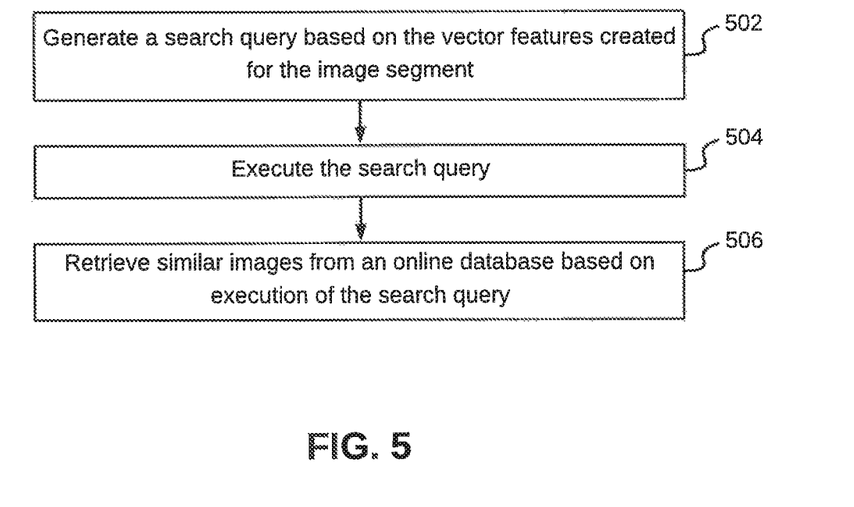
FIG. 5 illustrates a flowchart of a method for finding a plurality of similar images that are similar to an image segment, in accordance with another embodiment.

Referring now to FIG. 5, a flowchart of a method for finding a plurality of similar images that are similar to an image segment is illustrated, in accordance with another embodiment. Vector features created for the image segment are used to generate a search query at step 502. In an embodiment, before generating the search query, vector features may be ordered based on associated attributes. With the name of the object in the image segment, the search query is generated to extract similar images. The search query is then executed at step 504.

At step 506, similar images are retrieved from the online database based on execution of the search query. Each of the similar images are retrieved along with an associated description. In other words, on retrieval from the online database, a particular similar image would also include a description.

Figure 6:
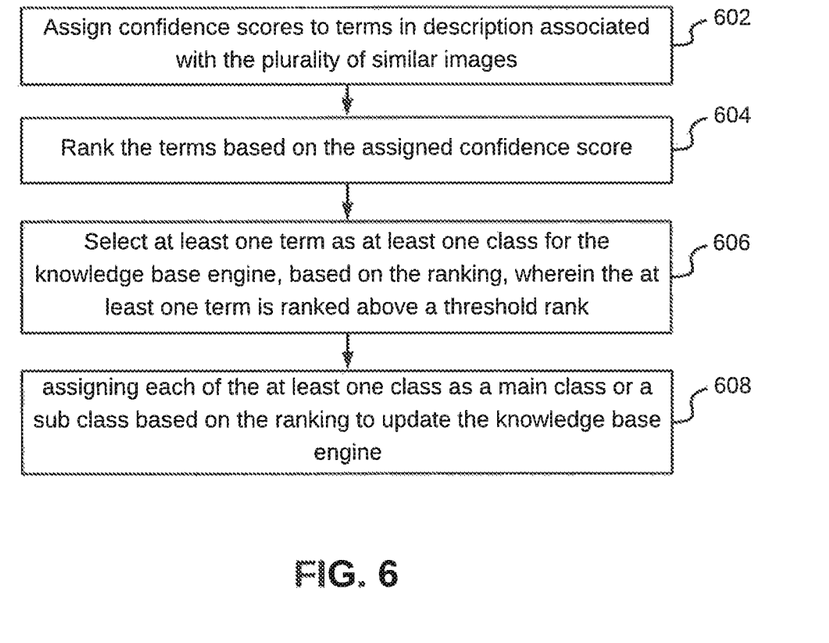
FIG. 6 illustrates a flowchart of a method for identifying one or more similar objects in the plurality of similar images using a knowledge base engine and updating the knowledge base engine, in accordance with an embodiment.

Referring now to FIG. 6, a flowchart of a method for identifying one or more similar objects in the plurality of similar images using knowledge base engine 208 and updating knowledge base engine 208 is illustrated, in accordance with an embodiment. In order to identify the one or more similar objects, a map reduce method is used to analyze the description of each similar image. The map reduce method includes two steps, i.e., map and reduce. In the map step, a first set of data is taken and converted into a second set of data, such that, individual elements are broken into key/value pairs. The reduce step, takes output from the map step and combines those data into smaller sets of data.

To this end, once the plurality of similar images have been retrieved, confidence scores are assigned to terms in description associated with the plurality of similar images at step 602. Thereafter, the terms are ranked based on the assigned confidence score at step 604. One or more terms that are ranked above a threshold rank are selected as one or more classes for knowledge base engine 208 at step 606. A class may be one of a parent class or a sub-class.

By way of an example of the steps 602 to 604, there may be a class named "Bag" in knowledge base engine 208 and detailed description of similar images, which include similar objects, are identified. The detailed description for one of the similar images may be "Hidesign bag 24 litres wallet." Information from the description of the similar image is retrieved and confidence scores is assigned to each term in the description. Confidence score may be assigned based on frequency of occurrence of the term. This is depicted in the table 1 given below:

TABLE 1

| Object Term | Confidence Score |
| --- | --- |
| Hidesign | 1 |
| Bag | 1 |
| 24 Litres | 1 |
| Wallet | 1 |

When knowledge base engine 208 is trained and populated with multiple such similar images, a complete dataset that includes all possible object terms may be depicted as given in table 2:

TABLE 2

| Object Term | Confidence Score |
| --- | --- |
| Hidesign | 20 |
| Nike | 50 |
| Adidas | 50 |
| Bag | 200 |
| Wallet | 80 |
| Handbag | 100 |
| 15 Litres | 40 |
| 24 Litres | 90 |

The object terms in table 2 are then ranked based on confidence score and top two ranked object terms are selected to be includes as classes in knowledge base engine 208. This is depicted in table 3 give below:

TABLE 3

| Rank | Object Term | Confidence Score |
| --- | --- | --- |
| 1 | Bag | 200 |
| 2 | Hand bag | 100 |

By way of another example, there may be a class named "Car" in knowledge base engine 208 and detailed description of similar images, which include similar objects, are identified. The detailed description for one of the similar images may be "BMW car 5-seater car race car." Information from the description of the similar image is retrieved and confidence scores is assigned to each term in the description. Confidence score may be assigned based on frequency of occurrence of the term. This is depicted in the table 4 given below:

TABLE 4

| Object Term | Confidence Score |
|---|---|
| BMW | 1 |
| Car | 1 |
| 5-Seater Car | 1 |
| Race Car | 1 |

When knowledge base engine 208 is trained and populated with multiple such similar images, a complete dataset that includes all possible object terms may be depicted as given in table 5:

TABLE 5

| Object Term | Confidence Score |
|---|---|
| Car | 100 |
| Racer Car | 40 |
| BMW | 25 |
| 2017 Model Car | 20 |
| 5-Seater Car | 45 |

The object terms in table 5 are then ranked based on confidence score and top two ranked object terms are selected to be includes as classes in knowledge base engine 208. This is depicted in table 6 give below:

TABLE 6

| Rank | Object Term | Confidence Score |
|---|---|---|
| 1 | Car | 100 |
| 2 | BMW | 50 |

By way of yet another example, there may be a class named "pedestrian" in knowledge base engine 208 and detailed description of similar images, which include similar objects, are identified. The detailed description for one of the similar images may be "Human Pedestrian Police Adult." Information from the description of the similar image is retrieved and confidence scores is assigned to each term in the description. Confidence score may be assigned based on frequency of occurrence of the term. This is depicted in the table 7 given below:

TABLE 7

| Object Term | Confidence Score |
|---|---|
| Human | 1 |
| Pedestrian | 1 |
| Police | 1 |
| Adult | 1 |

When knowledge base engine 208 is trained and populated with multiple such similar images, a complete dataset that includes all possible object terms may be depicted as given in table 8:

TABLE 8

| Object Term | Confidence Score |
|---|---|
| Human | 50 |
| Police | 20 |
| Adult | 13 |
| Elderly person | 10 |
| Pedestrian | 23 |

The object terms in table 8 are then ranked based on confidence score and top two ranked object terms are selected to be includes as classes in knowledge base engine 208. This is depicted in table 9 give below:

TABLE 9

| Rank | Object Term | Confidence Score |
|---|---|---|
| 1 | Human | 50 |
| 2 | Pedestrian | 25 |

By way of another example, there may be a class named "Bike" in knowledge base engine 208 and detailed description of similar images, which include similar objects, are identified. The detailed description for one of the similar images may be "Hero Honda 220 cc racing bike." Information from the description of the similar image is retrieved and confidence scores is assigned to each term in the description. Confidence score may be assigned based on frequency of occurrence of the term. This is depicted in the table 10 given below:

TABLE 10

| Object Term | Confidence Score |
|---|---|
| Bike | 1 |
| Hero Honda | 1 |
| Racing Bike | 1 |
| 220 cc Bike | 1 |

When knowledge base engine 208 is trained and populated with multiple such similar images, a complete dataset that includes all possible object terms may be depicted as given in table 11:

TABLE 11

| Object Term | Confidence Score |
|---|---|
| Bike | 25 |
| Racing Bike | 10 |
| 220 cc Bike | 8 |
| 5 Geared Bike | 5 |
| Hero Honda | 12 |

The object terms in table 11 are then ranked based on confidence score and top two ranked object terms are selected to be includes as classes in knowledge base engine 208. This is depicted in table 12 give below:

TABLE 12

| Rank | Object Term | Confidence Score |
|---|---|---|
| 1 | Bike | 25 |
| 2 | Hero Honda | 12 |

Based on the ranks assigned to the one or more terms selected at step 606, each of the one or more terms is assigned as a main class or a sub-class in knowledge base engine 208. In an embodiment, when the term that is assigned the top rank is not already included in knowledge base engine 208 as a main class or a parent class, then the term will be updated as a new class in knowledge base engine 208. However, when the term that is assigned the top rank is already included in knowledge base engine 208 as a main class or a parent class, then the term that assigned the second rank will be updated as a sub-class of the main o parent class in knowledge base engine 208. Along with the class names (parent class or sub-class), knowledge base engine 208 is also updated with associated image characteristic details associated with each class, for example, shape, texture, or color. In an embodiment, knowledge base engine 208 may store the information regarding classes (i.e., main class and associated sub-classes) in the form of a graph data structure.

Figure 7:
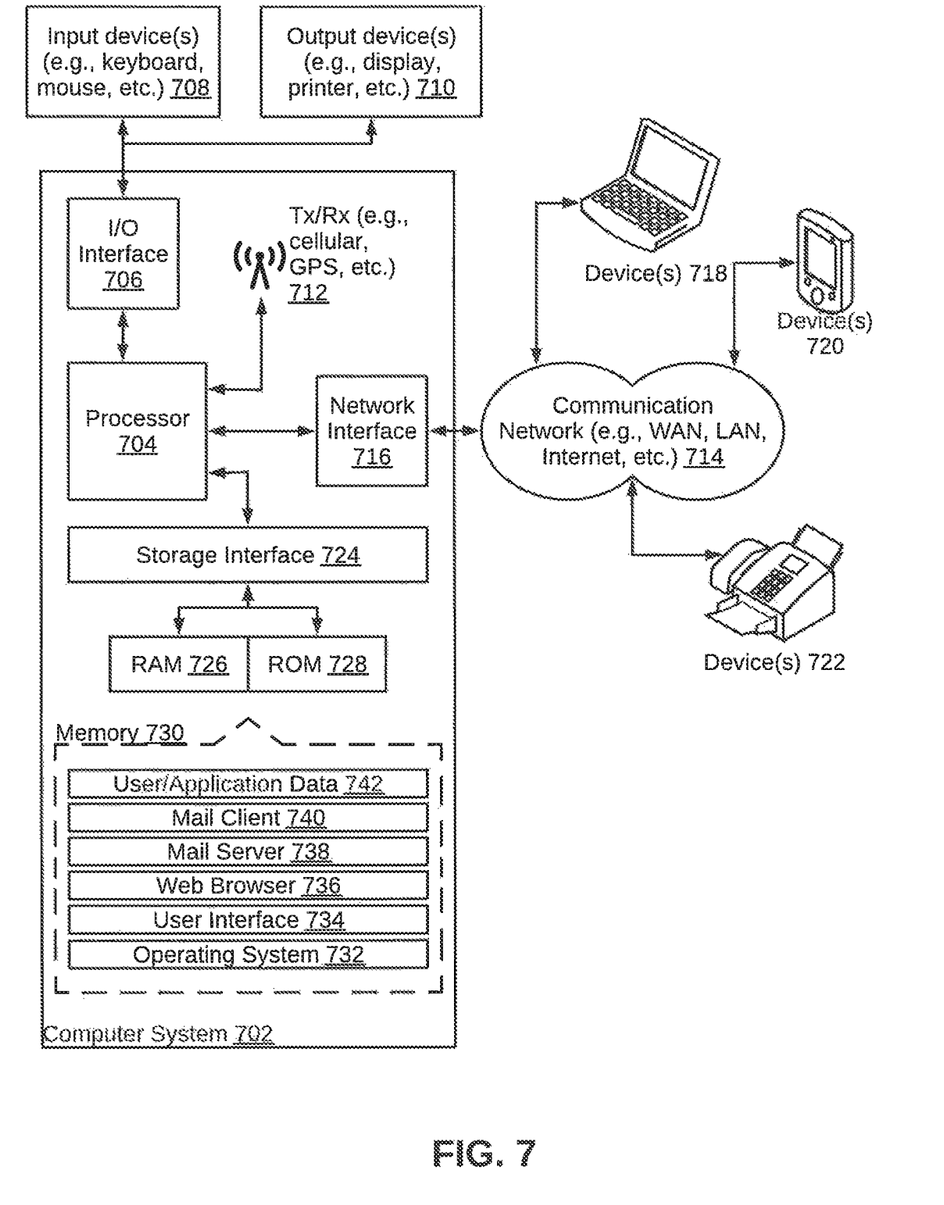
FIG. 7 illustrates a block diagram of an exemplary computer system for implementing various embodiments.

In continuation of an example given above and referring back to table 1, 2, and 3, considering that on a given day an image processed by image processing device 102 includes a Bag, which is not included as a class in knowledge process engine 208, and is ranked one. Thus, the class "Bag" is updated to knowledge process engine 208 as a main or parent class. On a subsequent day, new images processed by image processing device 102 may include different types of bag, for example, hand bags or back packs. Thus, knowledge base engine 208 will be now be update with "Hand bag" and "Back pack" as sub-classes of the main class "Bag." This information may be stored in knowledge base engine 208 in the form of a graph structure depicted below:

FIG. 7 is a block diagram of an exemplary computer system for implementing various embodiments. Computer system 702 may include a central processing unit ("CPU" or "processor") 704. Processor 704 may include at least one data processor for executing program components for executing user- or system-generated requests. A user may include a person, a person using a device such as such as those included in this disclosure, or such a device itself. Processor 704 may include specialized processing units such as integrated system (bus) controllers, memory management control units, floating point units, graphics processing units, digital signal processing units, etc. Processor 704 may include a microprocessor, such as AMD® ATHLON® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. Processor 704 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 704 may be disposed in communication with one or more input/output (I/O) devices via an I/O interface 706. I/O interface 706 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using I/O interface 706, computer system 702 may communicate with one or more I/O devices. For example, an input device 708 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. An output device 710 may be a printer, fax machine, video display (e.g., cathode ray tube (CRT), liquid crystal display (LCD), light-emitting diode (LED), plasma, or the like), audio speaker, etc. In some embodiments, a transceiver 712 may be disposed in connection with processor 704. Transceiver 712 may facilitate various types of wireless transmission or reception. For example, transceiver 712 may include an antenna operatively connected to a transceiver chip (e.g., TEXAS® INSTRUMENTS WILINK WL1283® transceiver, BROADCOM® BCM4550IUB8® transceiver, INFINEON TECHNOLOGIES® X-GOLD 618-PMB9800® transceiver, or the like), providing IEEE 802.11a/b/g/n, Bluetooth, FM, global positioning system (GPS), 2G/3G HSDPA/HSUPA communications, etc.

In some embodiments, processor 704 may be disposed in communication with a communication network 714 via a network interface 716. Network interface 716 may communicate with communication network 714. Network interface 716 may employ connection protocols including, without limitation, direct connect, Ethernet (e.g., twisted pair 50/500/5000 Base T), transmission control protocol/internet protocol (TCP/IP), token ring, IEEE 802.11a/b/g/n/x, etc. Communication network 714 may include, without limitation, a direct interconnection, local area network (LAN), wide area network (WAN), wireless network (e.g., using Wireless Application Protocol), the Internet, etc. Using network interface 716 and communication network 714, computer system 702 may communicate with devices 718, 720, and 722. These devices may include, without limitation, personal computer(s), server(s), fax machines, printers, scanners, various mobile devices such as cellular telephones, smartphones (e.g., APPLE® IPHONE® smartphone, BLACKBERRY® smartphone, ANDROID® based phones, etc.), tablet computers, eBook readers (AMAZON® KINDLE® ereader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 702 may itself embody one or more of these devices.

In some embodiments, processor 704 may be disposed in communication with one or more memory devices (e.g., RAM 726, ROM 728, etc.) via a storage interface 724. Storage interface 724 may connect to memory 730 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 730 may store a collection of program or database components, including, without limitation, an operating system 732, user interface application 734, web browser 736, mail server 738, mail client 740, user/application data 742 (e.g., any data variables or data records discussed in this disclosure), etc. Operating system 732 may facilitate resource management and operation of computer system 702. Examples of operating systems 732 include, without limitation, APPLE® MACINTOSH® OS X platform, UNIX platform, Unix-like system distributions (e.g., Berkeley Software Distribution (BSD), FreeBSD, NetBSD, Open-BSD, etc.), LINUX distributions (e.g., RED HAI®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 734 may facilitate display, execution, interaction, manipulation, or operation of program components through textual or graphical facilities. For example, user interfaces may provide computer interaction interface elements on a display system operatively connected to computer system 702, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (e.g., AERO® platform, METRO® platform, etc.), UNIX X-WINDOWS, web interface libraries (e.g., ACTIVEX® platform, JAVA® programming language, JAVASCRIPT® programming language, AJAX® programming language, HTML, ADOBE® FLASH® platform, etc.), or the like.

In some embodiments, computer system 702 may implement a web browser 736 stored program component. Web browser 736 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APis), etc. In some embodiments, computer system 702 may implement a mail server 738 stored program component. Mail server 738 may be an Internet mail server such as MICROSOFT® EXCHANGE® mail server, or the like. Mail server 738 may utilize facilities such as ASP, ActiveX, ANSI C++/C#, MICROSOFT .NET® programming language, CGI scripts, JAVA® programming language, JAVASCRIPT® programming language, PERL® programming language, PHP® programming language, PYTHON® programming language, WebObjects, etc. Mail server 738 may utilize communication protocols such as internet message access protocol (IMAP), messaging application programming interface (MAPI), Microsoft Exchange, post office protocol (POP), simple mail transfer protocol (SMTP), or the like. In some embodiments, computer system 702 may implement a mail client 740 stored program component. Mail client 740 may be a mail viewing application, such as APPLE MAIL® mail client, MICROSOFT ENTOURAGE® mail client, MICROSOFT OUTLOOK® mail client, MOZILLA THUNDERBIRD® mail client, etc.

In some embodiments, computer system 702 may store user/application data 742, such as the data, variables, records, etc. as described in this disclosure. Such databases may be implemented as fault-tolerant, relational, scalable, secure databases such as ORACLE® database OR SYB-ASE® database. Alternatively, such databases may be implemented using standardized data structures, such as an array, hash, linked list, struct, structured text file (e.g., XML), table, or as object-oriented databases (e.g., using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments of the invention provide method and device for detecting objects from scene images by using dynamic knowledge base. The proposed method intelligently learns and detects newly encountered objects and dynamically updates knowledge base engine 208 for future use. Additionally, the solution helps in executing object specific algorithms during run time, which reduces overall computing cost and time. The solution also helps autonomous vehicle to make robust and accurate decisions in detecting and identifying objects in front of the autonomous vehicle in order to aid safe navigation. In addition to autonomous vehicles, the proposed solution can also be used in different object detection applications, which may include but are not limited to robot's vision, surveillance, and consumer and retail stores.

The specification has described method and device for detecting objects from scene images by using dynamic knowledge base. The illustrated steps are set out to explain the exemplary embodiments shown, and, it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for detecting objects from scene images, the method comprising:
segmenting, by an image processing device, a scene image captured by at least one camera into a plurality of image segments, wherein each of the plurality of image segments comprise a plurality of pixels;
detecting, by the image processing device, at least one object in each of the plurality of image segments, wherein detecting the at least one object comprises retrieving object related descriptions associated with the at least one object by searching an online database with each of the plurality of image segments;
finding, by the image processing device, a plurality of similar images from the online database based on the at least one object identified in each of the plurality of image segments, wherein finding the plurality of similar images comprises:
generating a search query that comprises vector features created for an image segment and the object related descriptions associated with the at least one object in the image segment; and
retrieving the plurality of similar images from the online database based on execution of the search query, wherein each of the plurality of similar images are retrieved along with an associated description;
identifying using a knowledge base engine, by the image processing device, at least one similar object in the plurality of similar images based on the associated description and image characteristics;
updating, by the image processing device, the knowledge base engine based on the at least one similar object identified from the plurality of similar images; and
training, by the image processing device, a neural network to detect objects from scene images captured by the at least one camera, based on the updated knowledge base engine.

2. The method of claim 1, wherein segmenting comprises:
grouping pixels in the scene image to generate the plurality of image segments, wherein pixels in each image segment comprises same image characteristics, and wherein the image characteristics comprise at least one of color, intensity, texture, or shape; and
creating vector features for each of the plurality of image segments based on associated image characteristics.

3. The method of claim 2 further comprising assigning a label to each of the plurality of image segments based on the associated image characteristics.

4. The method of claim 2, wherein the at least one object in the image segment is identified based on the vector features created for the image segment.

5. The method of claim 1, wherein identifying the at least one similar object comprises:
assigning confidence scores to terms in the associated description related to the plurality of similar images;
ranking the terms based on the assigned confidence scores; and
selecting at least one term as at least one class for the knowledge base engine, based on the ranking, wherein the at least one term is ranked above a threshold rank.

6. The method of claim 5, wherein updating the knowledge base engine comprises assigning each of the at least one class as a main class or a sub class based on the ranking.

7. The method of claim 1, wherein the neural network is a convolutional neural network that is trained using the updated knowledge base engine.

8. The method of claim 1 further comprising communicating, by the image processing device, information related to the detected objects to a navigation control system in an autonomous vehicle for navigation.

9. An image processing device for detecting objects from scene images, the image processing device comprising:
a processor; and
a memory communicatively coupled to the processor, wherein the memory stores processor instructions, which, on execution, causes the processor to:
segment a scene image captured by at least one camera into a plurality of image segments, wherein each of the plurality of image segments comprise a plurality of pixels;
detect at least one object in each of the plurality of image segments, wherein detecting the at least one object comprises retrieving object related descriptions associated with the at least one object by searching an online database with each of the plurality of image segments;
find a plurality of similar images from the online database based on the at least one object identified in each of the plurality of image segments, wherein finding the plurality of similar images comprises:
generating a search Query that comprises vector features created for an image segment and the object related descriptions associated with the at least one object in the image segment; and
retrieving the plurality of similar images from the online database based on execution of the search query, wherein each of the plurality of similar images are retrieved along with an associated description;
identify using a knowledge base engine, at least one similar object in the plurality of similar images based on the associated description and image characteristics;
update the knowledge base engine based on the at least one similar object identified from the plurality of similar images; and
train a neural network to detect objects from scene images captured by the at least one camera, based on the updated knowledge base engine.

10. The image processing device of claim 9 further comprising the at least one camera to capture the scene image.

11. The image processing device of claim 9, wherein to segment the scene image, the processor instructions cause the processor to:
group pixels in the scene image to generate the plurality of image segments, wherein pixels in each image segment comprises same image characteristics, and wherein the image characteristics comprise at least one of color, intensity, texture, or shape; and
create vector features for each of the plurality of image segments based on associated image characteristics.

12. The image processing device of claim 11, the processor instructions cause the processor to assign a label to each of the plurality of image segments based on the associated image characteristics.

13. The image processing device of claim 11, wherein the at least one object in the image segment is identified based on the vector features created for the image segment.

14. The image processing device of claim 9, wherein to identify the at least one similar object, the processor instructions cause the processor to:
   assign confidence scores to terms in the associated description related to the plurality of similar images;
   rank the terms based on the assigned confidence scores; and
   select at least one term as at least one class for the knowledge base engine, based on the ranking, wherein the at least one term is ranked above a threshold rank.

15. The image processing device of claim 14, wherein to update the knowledge base engine, the processor instructions cause the processor to assign each of the at least one class as a main class or a sub class based on the ranking.

16. The image processing device of claim 9, wherein the neural network is a convolutional neural network that is trained using the updated knowledge base engine.

17. The image processing device of claim 9, wherein the processor instructions cause the processor to communicate information related to the detected objects to a navigation control system in an autonomous vehicle for navigation.

18. A non-transitory computer-readable storage medium having stored thereon, a set of computer-executable instructions causing a computer comprising one or more processors to perform steps comprising:
   segmenting a scene image captured by at least one camera into a plurality of image segments, wherein each of the plurality of image segments comprise a plurality of pixels;
   detecting at least one object in each of the plurality of image segments, wherein detecting the at least one object comprises retrieving object related descriptions associated with the at least one object by searching an online database with each of the plurality of image segments;
   finding a plurality of similar images from the online database based on the at least one object identified in each of the plurality of image segments, wherein finding the plurality of similar images comprises:
      generating a search query that comprises vector features created for an image segment and the object related descriptions associated with the at least one object in the same segment; and
      retrieving the plurality of similar images from the online database based on execution of the search query, wherein each of the plurality of similar images are retrieved along with an associated description;
   identifying using a knowledge base engine, at least one similar object in the plurality of similar images based on the associated description and image characteristics;
   updating the knowledge base engine based on the at least one similar object identified from the plurality of similar images; and
   training a neural network to detect objects from scene images captured by the at least one camera, based on the updated knowledge base engine.

* * * * *